United States Patent
Brazeau et al.

(10) Patent No.: US 11,836,528 B2
(45) Date of Patent: Dec. 5, 2023

(54) THROTTLING THREAD RESOURCES OF SERVICE COMPUTING PLATFORM

(71) Applicant: Salesforce, Inc., San Francisco, CA (US)

(72) Inventors: Jeremiah David Brazeau, Hudson, NH (US); Sumanth Kondakindi, Burlington, MA (US); Dmitriy Ryabkov, Burlington, MA (US); Adam Elliott, Burnaby (CA); Stefan Piesche, Burlington, MA (US); Metin Kilic, Burlington, MA (US); Yan Huang, Burlington, MA (US); Christopher David Boran, Burlington, MA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/949,644

(22) Filed: Sep. 21, 2022

(65) Prior Publication Data
US 2023/0021746 A1    Jan. 26, 2023

Related U.S. Application Data

(62) Division of application No. 16/865,848, filed on May 4, 2020, now Pat. No. 11,467,877.

(60) Provisional application No. 62/968,329, filed on Jan. 31, 2020.

(51) Int. Cl.
*G06F 9/50* (2006.01)
*G06F 11/34* (2006.01)

(52) U.S. Cl.
CPC ........ *G06F 9/5027* (2013.01); *G06F 11/3409* (2013.01); *G06F 2209/504* (2013.01); *G06F 2209/5018* (2013.01)

(58) Field of Classification Search
CPC ............... G06F 9/5027; G06F 11/3409; G06F 2209/5018; G06F 2209/504
See application file for complete search history.

(56) References Cited

U.S. PATENT DOCUMENTS

| | | |
|---|---|---|
| 5,809,235 A | 9/1998 | Sharma |
| 5,938,733 A | 8/1999 | Heimsoth |
| 6,182,109 B1 | 1/2001 | Sharma |
| 6,477,561 B1 | 11/2002 | Robsman |
| 8,185,906 B2 | 5/2012 | Muscarella |
| 8,738,759 B2 * | 5/2014 | Patel .................. G06F 11/3419 709/224 |
| 9,053,070 B1 | 6/2015 | Arguelles |
| 9,354,931 B1 | 5/2016 | Ryoo |
| 9,910,711 B1 | 3/2018 | Ryoo |
| 10,055,262 B1 | 8/2018 | Thomas |
| 10,284,660 B1 * | 5/2019 | Nene ....................... H04L 67/02 |
| 10,509,675 B2 | 12/2019 | Karmarkar |
| 10,885,023 B1 | 1/2021 | Gupta |
| 11,061,794 B1 | 7/2021 | Zhang |

(Continued)

*Primary Examiner* — Benjamin C Wu
(74) *Attorney, Agent, or Firm* — BUTZEL LONG

(57) ABSTRACT

Systems and techniques are provided for monitoring and managing the performance of services accessed by sites on a computing platform. When a performance issue is identified, a service is monitored to determine if calls to the service exceed a threshold completion time. If so, a resource available to call the service is adaptively throttled by the platform.

14 Claims, 5 Drawing Sheets

(56) References Cited

U.S. PATENT DOCUMENTS

| | | | |
|---|---|---|---|
| 2004/0003087 A1* | 1/2004 | Chambliss | H04L 41/5022 709/226 |
| 2005/0086359 A1 | 4/2005 | Banerjee | |
| 2005/0132335 A1 | 6/2005 | Maron | |
| 2006/0064483 A1* | 3/2006 | Patel | G06F 11/3419 709/224 |
| 2006/0080394 A1 | 4/2006 | Goodman | |
| 2008/0295107 A1 | 11/2008 | Muscarella | |
| 2009/0172194 A1* | 7/2009 | Ristock | H04L 41/5064 709/244 |
| 2012/0330711 A1* | 12/2012 | Jain | G06F 9/5072 709/224 |
| 2014/0089928 A1 | 3/2014 | Stern | |
| 2016/0092268 A1 | 3/2016 | Gleyzer | |
| 2017/0013050 A1 | 1/2017 | Vaks | |
| 2017/0180254 A1* | 6/2017 | Certain | G06F 9/00 |
| 2017/0185456 A1 | 6/2017 | Bramary | |
| 2018/0307536 A1 | 10/2018 | Fang | |
| 2021/0365324 A1* | 11/2021 | Wang | G06F 11/3006 |
| 2021/0373940 A1 | 12/2021 | Will | |
| 2022/0129460 A1* | 4/2022 | Clifford | G06F 9/505 |

\* cited by examiner

FIG. 5

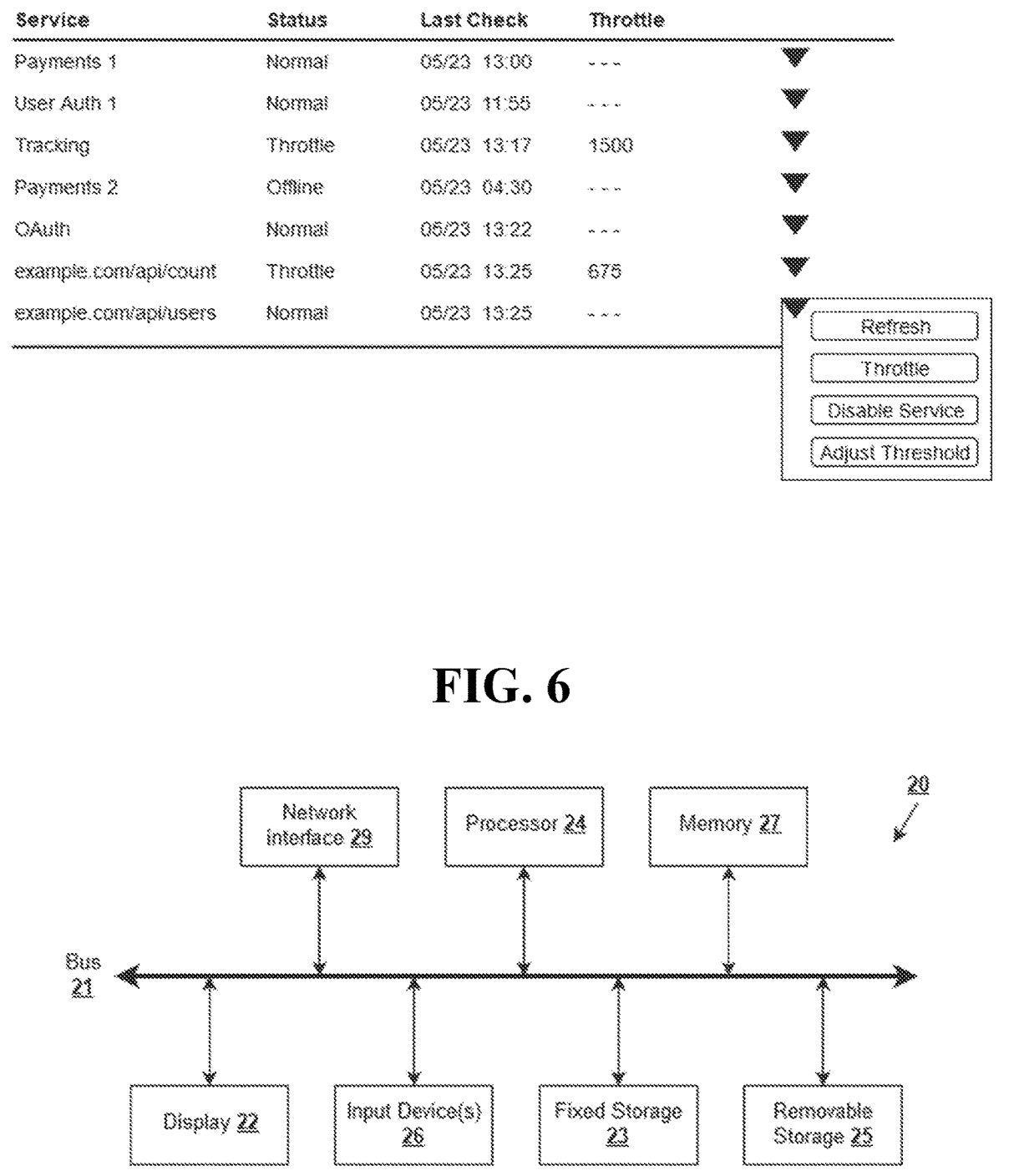

| Service | Status | Last Check | Throttle | |
|---|---|---|---|---|
| Payments 1 | Normal | 05/23 13:00 | - - - | ▼ |
| User Auth 1 | Normal | 05/23 11:55 | - - - | ▼ |
| Tracking | Throttle | 05/23 13:17 | 1500 | ▼ |
| Payments 2 | Offline | 05/23 04:30 | - - - | ▼ |
| OAuth | Normal | 05/23 13:22 | - - - | ▼ |
| example.com/api/count | Throttle | 05/23 13:25 | 675 | ▼ |
| example.com/api/users | Normal | 05/23 13:25 | - - - | ▼ |

- Refresh
- Throttle
- Disable Service
- Adjust Threshold

FIG. 6

Network Interface 29, Processor 24, Memory 27, Bus 21, Display 22, Input Device(s) 26, Fixed Storage 23, Removable Storage 25 — 20

THROTTLING THREAD RESOURCES OF SERVICE COMPUTING PLATFORM

BACKGROUND

Many services are provided by cloud-based systems or other systems that provide services for multiple end-users on behalf of various entities. For example, a multi-user computing platform may provide computing resources for use by any number of services, websites, or other end-user facing processes. Each site or service may be offered by the platform itself, or it may be offered on behalf of an entity that may be a customer of the platform itself. For example, a computing platform may provide resources that allow users to create and manage websites, e-commerce sites, subscription services, or the like, which each user may then offer to its own users. Typically such a platform will also manage all the related computing resources for its users' sites and services, such as processing resources, memory and database storage, internal and external communications resources and procedures, and the like. For example, a platform may maintain a large amount of hardware memory that is allocated to sites hosted by the platform as needed. Similarly, a platform may use any suitable database or other storage structure to store data for all of the hosted sites, which is then used to provide each site on behalf of the platform's users. The platform also may manage communications and data transfer between hosted sites and other internal or external resources, such as via external requests to other hosted services such as linked end-user accounts, payment processors, user authentication and/or authorization systems, and the like.

BRIEF DESCRIPTION OF THE DRAWINGS

FIG. 5 shows an example dashboard user interface for monitoring service performance according to an embodiment of the disclosed subject matter.

FIG. 6 shows an example computer architecture suitable for implementing embodiments disclosed herein.

DETAILED DESCRIPTION

Figure 1:
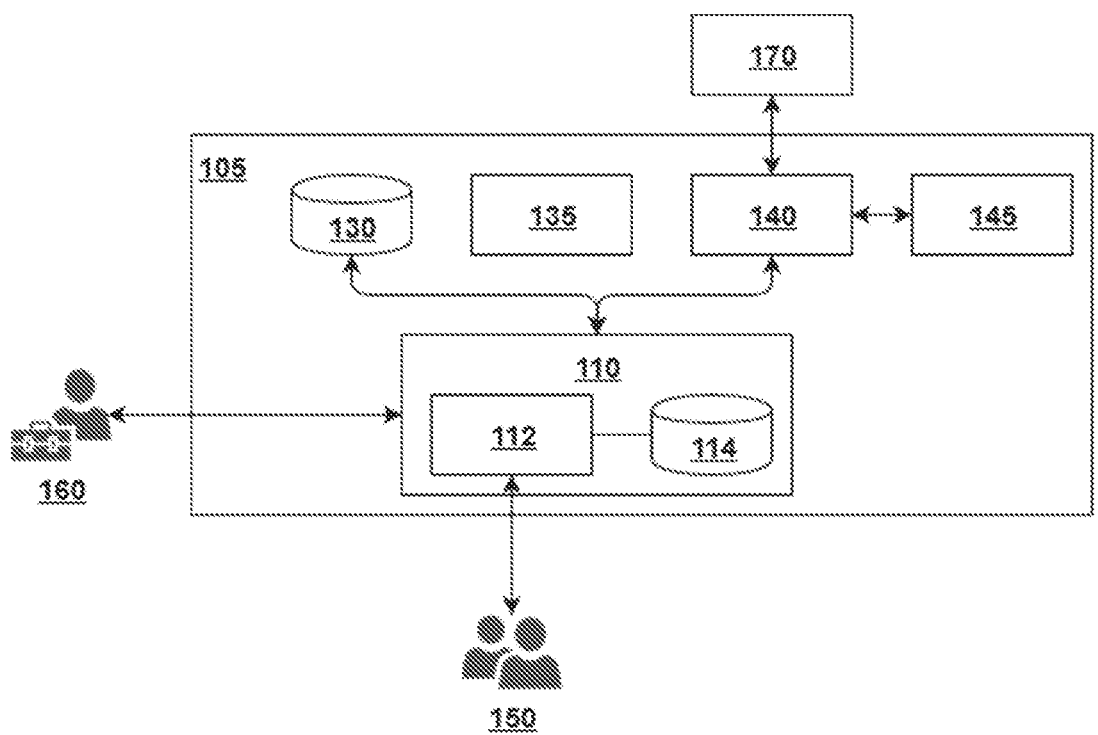
FIG. 1 shows a computerized platform according to an embodiment of the disclosed subject matter.

It has been found that computerized platforms that provide services on behalf of a large number of users may encounter various difficulties due to limited resources that are used inefficiently by sites provided by the platform. For example, a user may design a service that has inefficient memory management or is not designed to properly release resources allocated to the service once they are no longer in use, leading to less and less memory being available to the poorly designed service and all other services provided by the platform over time. In some cases, the performance of the platform may be improved by adding more of the limited resource, such as where additional database instances are started to address a need for increased database storage by sites provided by the platform. Further, sites hosted by the platform may access external or internal services which themselves may lead to poor performance of one or more sites on the platform. For example, many sites hosted by such a platform will use an external payment processor when executing end user orders to purchase goods or services. In some cases an external service may perform inefficiently or may not be capable of handling the complete volume of requests sent to the service by the platform and/or other sources. This can lead to increasing response times from the service, ultimately affecting the responsiveness and functionality of the sites that use them. However, the service may be sufficiently important to operation of one or more sites on the platform that it is desirable to continue using the service to the extent possible, while maintaining an acceptable level of operation of the sites that use them. For example, when a payment processor experiences issues that cause it to be slow but not entirely unresponsive, an e-commerce sites may prefer to keep the associated payment option available for its customers even though doing do reduces reduce the rate at which payments are submitted or increases the processing time of each request, rather than simply deactivating the interface to the their external affected payment processor(s) entirely, thereby making it completely unavailable to customers of the site. Alternatively, the e-commerce site may prefer to disable the particular payment processor until it is functioning properly, so as to prevent disruptions to the overall site and user experience. However, monitoring external services and making responsive adjustments to a site may be overly burdensome for a site owner and, in many cases, may not be possible for the individual site or within a platform on which the site is hosted. For example, a site owner often may not be able to tell if the external payment processor or other service is performing poorly in general or just with respect to his own site or certain requests from his site.

Embodiments disclosed herein provide systems and techniques to manage resources assigned to internal and/or external services, so as to maintain the operation of sites provided by a computerized platform even where such services may not behave optimally or may otherwise encounter difficulties that affect the operation of sites provided by the platform. To do so, the platform may manage use of one or more limited resources that are assigned for use in accessing the services, as disclosed in further detail below. Embodiments disclosed herein thus may allow for automatic or semi-automatic management of services used by one or more sites to improve the functionality, responsiveness, availability, and other aspects of the site, even when services used by the site may experience technical problems that affect the use of the service by the site.

As used herein, a "user" may refer to any entity that may maintain a site on a multi-user hosting platform, which may be a corporation or other organization, an individual, or any other entity that provides goods and/or services to its own end-users. For example, a computerized platform as disclosed herein may provide a framework that allows its customers to develop and deploy e-commerce websites for the sales of goods and/or services, subscription services, information sites or services, or the like, which are provided to each user's own end-user customers. That is, a "user" of the hosting platform may be an owner and/or operator of a site that is accessed by "end users" who may be, for example, customers of the owner/operator user. The platform may allow users to manage the operation and appearance of their site on the platform, to connect the user's site to other data sources and/or to export data to other systems; to manage resources such as images, videos, text, and the like; and, more generally, to manage the presentation and operation of the site and its interaction with the user's own end users. A computerized platform as disclosed herein typically will be implemented on one or more servers and may be provided as a cloud-based service, as will be readily understood by one of skill in the art.

FIG. 1 shows a computerized platform as disclosed herein. The platform 105 may be implemented on any suitable computer hardware and software, including server and/or cloud-based architectures. The platform may host any number of sites 110 that provide services to any number of end users 150. Each site 110 may be maintained by a user 160 of the platform 105, which may be any individual, corporation, organization, or any other type of entity. Each site 110 may include one or more user-facing services and/or interfaces 112 that are accessed by the end user(s) 150. The site 110 also may include backend, management, or administrative services and/or interfaces that are accessed by the user 160 that controls the site 110. The site 110 may include internal resources 114, such as where a custom data source 114 has been implemented by the user 160 within, or for dedicated use by, the site 110. Additionally, each site 110 may be provided with various computing resources by the platform 105. For example, the site 110 shown in FIG. 1 uses resources 130, 140 provided by the platform 105. The resources may be processor time, cycles, or the like; physical or virtual memory; logical or physical storage; database resources; or any other known or developed computing resource that may be used by the site 110. The platform 105 also may provide other resources 135 that are not used by the site 110 but may be used by other sites and/or for operation and management of the platform 105 itself.

One resource that the platform 105 may provide to sites 110 is a service manager 140, which may coordinate calls by sites 110 hosted by the platform 105 to various internal and external services 145, 170, respectively. For example, the service manager 140 may provide a standardized interface by which sites 110 may access the services 145, 170. As a specific example, external service 170 may be a payment processor that processes payment information received from an end user 150 when making a purchase from a site 110. As another example, external service 170 may be a single sign-on user authentication service that a site 110 may use to allow end users 150 to log in to the site 110 without needing credentials specific to the site 110. As another example, an internal service 145 may be a user lookup service, an administrative interface such as a service that provides performance information about the site 110 to a site owner 160, an internal payment processor that is operated by the platform 105, or any other appropriate service. The service manager 140 may provide a standardized interface to such services, so that each site 110 on the platform 105 can make standardized calls to each service to obtain the appropriate information or action. The use of a service manager 140 also allows the platform 105 to monitor, report on, and take action in response to the status of the associated services 170, 145.

In some cases the performance of a service 145, 170 may affect performance of sites 110 that use the service or the platform 105 itself. For example, if an external service 170 is a payment processing service that is used by multiple sites 110, poor performance of the service 170 may cause customer orders placed via site 110 to fail or take an unacceptable amount of time to complete. Other services may present similar problems to sites that use them.

One technique for addressing poor performance of a service is to prevent use of the service for a time, typically until tests indicate that the service has returned to normal. However, such an approach may be unacceptable where the service is a key component of one or more sites on the platform, or where a service generally requires more resources to access or is generally slower to respond than other services, or otherwise where it is unacceptable to simply cut off sites from use of the service. Embodiments disclosed herein address this issue by adaptively limiting the amount of resources available for each service to use, at each level at which the service is used, while still making the service available to sites on the platform. The specific resource used as a limit on service calls may vary depending upon the structure of the platform. For example, in some cases the number of file handlers, sockets, logical or physical processors, or memory cells allocated to a service may be used to throttle the service. In many cases, the number of threads allocated to the service, either as an absolute number or a portion of total threads allocated for service calls by the platform, may be throttled. As used in the art, a "thread" refers to the basic execution unit to which the platform or an operating system allocates processing time and resources. Examples and illustrations provided herein are described with respect to the number or proportion of threads allocated to a service, but other limiting resources may be used without departing from the scope or content of the present disclosure.

Figure 2:
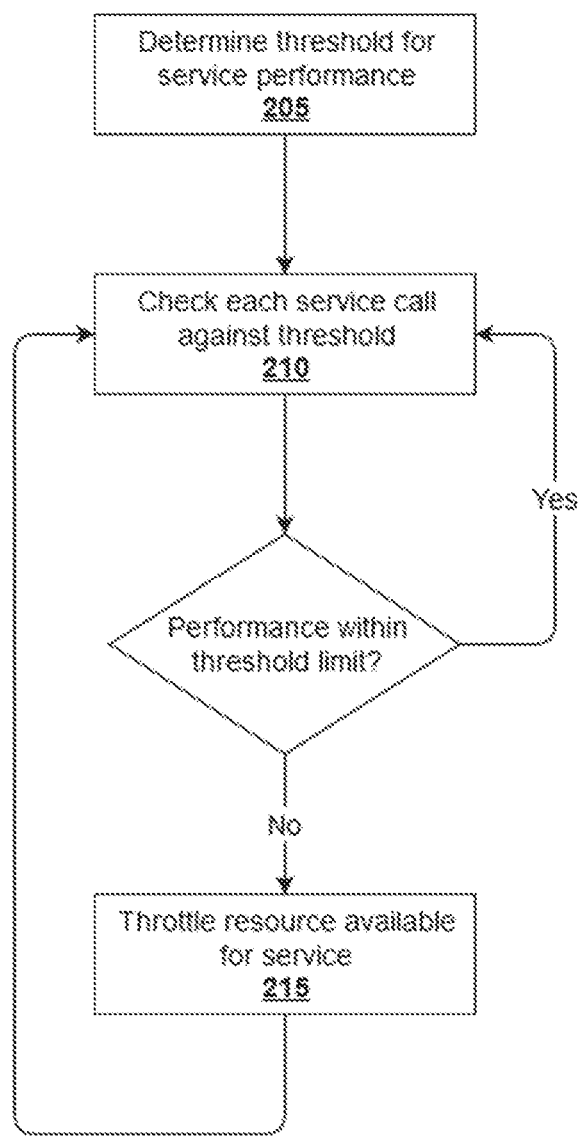
FIG. 2 shows an example process for setting a performance threshold for a service according to an embodiment of the disclosed subject matter.

FIG. 2 shows an example process for limiting resources on a computerized platform as disclosed herein, using the number of threads allocated to the service. At 205, a threshold may be determined for the service, above which the service will be considered to be in a bad state, i.e., is not operating as expected or desired. For example, the platform may track calls to the service over a period of time and occasionally or periodically determine the P95 service call execution time, i.e., the total time from call to completion below which 95% of successful calls to the service are completed. A number of P95 execution times may be averaged or the median P95 time taken as the threshold. As a specific example, 10, 11, 12, or any other number of P95 or other measurements of call execution time may be used to determine the threshold. In general, it may be desirable to use a sufficient number of measurements so that the platform can react quickly enough when there is an issue with a service, but not so quickly that the platform identifies a problem with the service when in fact none exists.

At 210, each call to the service may be compared to the threshold and a running evaluation of the service may be performed, such that if at any point an individual service call or a percentage of service calls within a period of time exceeds the threshold, the service may be identified as being in a bad state. If the performance of the service stays within the threshold limit, monitoring may continue at 210. The service may be considered to be operating within the threshold if a predefined percentage of service calls are completed in not more than the threshold time. For example, a service may be considered to be operating within the threshold limit if 50% of calls to the service within any given period or within a predefined period of time are completed in less than the threshold limit. Alternatively, if a predefined number of calls to the service are found to complete in greater than the threshold limit determined at 205, the service may be identified as operating above the threshold limit.

If the service exceeds the performance threshold determined at 205, at 215 a resource available for the service may be throttled by the platform. As previously disclosed, such an approach may allow for sites on the platform to continue to use the service to the extent possible, while preventing a poorly-performing service from impacting overall operation of the sites that call the service, other sites on the platform, or the platform itself.

Figure 3:
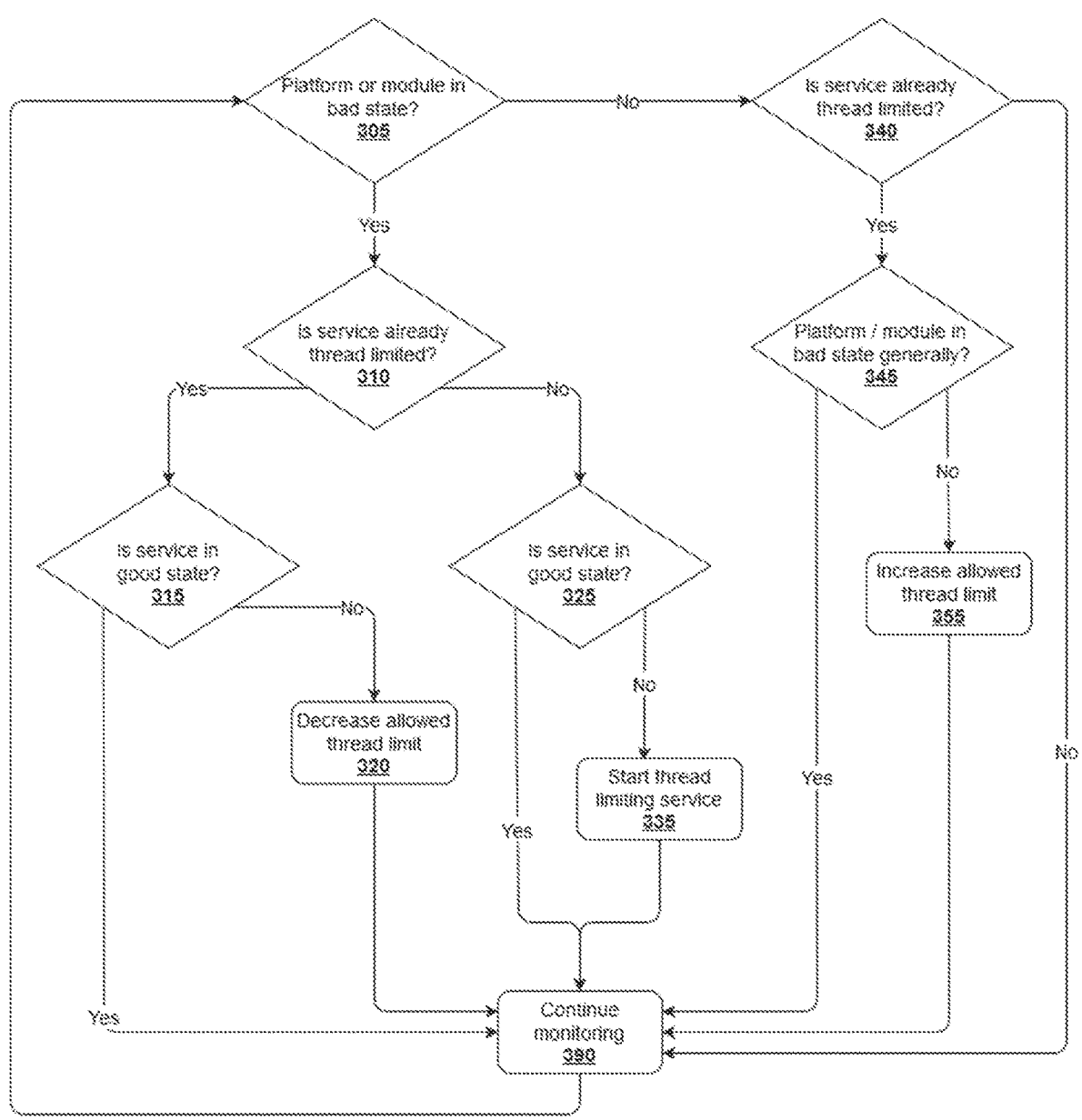
FIG. 3 shows an example process for limiting a resource available for calling a service by sites on a computing platform according to an embodiment of the disclosed subject matter.

FIG. 3 shows an example process for limiting a resource, in this case the threads available for service calls to a particular service, according to the present disclosure. At 305, the platform may determine that the platform, a portion or module of the platform, or a service is in a bad state, i.e., is not performing as expected or desired. For example, a monitoring service may determine that a portion of the platform has increasing response times or is receiving user complaints regarding performance. As a specific example, a monitoring service on the platform may determine than an e-commerce module of the platform that provides resources for e-commerce sites hosted by the platform is experiencing increasing response times and/or processes on the sites are timing out. It may not be apparent what is causing the decrease in performance, or it may be apparent that one or more service calls likely is responsible. If the platform, module, service, or other higher-level component is determined to be experiencing performance issues at 305, at 310 each relevant service may be considered to determine whether the service is already being throttled; in this example, it will be determined whether each service already has a thread limit imposed on execution of calls to the service. If a single service is initially determined to be experiencing degraded performance, the specific service may be considered alone.

If a service is already thread limited at 310 and is found to be in a good state at 315, no action is taken and monitoring continues at 390. Alternatively, if the service is already thread limited at 310 but is found not to be in a good state at 315, i.e., it exceeds a threshold as previously disclosed, it may be subject to a further resource limit at 320. In this example, the number of threads available for calls to the service may be decreased at 320. The thread limit may be applied for the entire service across a platform, for each site that calls the service, or for a single site or group of sites on the platform.

If a service is not already thread limited at 310 and is in a good state at 325, no action is taken and monitoring of the platform and service(s) continues at 390. Alternatively, if the service is not already limited at 310 and is not in a good state at 325, i.e., it is exceeding a threshold as previously disclosed or otherwise not performing as desired, at 335 the service may be thread limited. In this example, the number of threads available to the service may be limited to a maximum number of concurrent threads, either as an absolute number or as a percentage of the total number of threads available for service calls on the platform. When the platform reaches the thread limit, further calls to the service may be queued for later processing or may return an indication that the service is not available or an error message to the site that initiated the service call that will not be completed. In cases where the call is queued, the associated site may appear less responsive but still functional to an end user. Where the call is rejected or returns an error, the site may appear less responsive, unresponsive, or non-functional, depending upon the interface and information provided by the site. The platform may provide a mechanism for the site to indicate to the end user that processing is delayed or that the service is unavailable or temporarily unavailable.

As previously disclosed, the thread limit imposed at 335 may apply to the service as a whole, or to calls made to the service by a site or group of sites, or a per-site limit may be imposed for the service. After applying the thread limit to the service, monitoring then continues at 390, returning to 305.

Service monitoring as disclosed herein also may be performed when no platform, module, and/or service is found to be in a bad state at 305, i.e., the system is performing as expected. In this case, one or more services may be considered at 340 to see if the service is already thread limited. For example, a service may have been previously thread limited at 310-335 and subsequent calls to the service no longer exceed a threshold as previously disclosed. If a service is found to be thread limited at 340 and the platform, module, or service is in a bad state generally, i.e., is not performing as desired but the poor performance appears unrelated to the service and/or any thread limiting on the service, no further action may be taken and monitoring may continue at 390/305. Alternatively, if the platform, module, service or other component being considered at 345 is performing acceptably, the existing thread limit may be increased at 355. This may happen, for example, where a service was previously not operating within a designated threshold and consequently had a thread limit imposed, but now is operating within the threshold. By gradually relaxing the thread limit through the process shown, the service may be made available for use by sites to the degree possible without impacting performance of the site, service, or other component of the platform.

More generally, the process shown in FIG. 3 implements a step function for thread limiting of a service. When it is determined that a particular service needs to be throttled, such as where performance of the service exceeds a service call response threshold as disclosed with respect to FIG. 2, the number of threads available for the service may be reduced to a lower level, i.e., moved down on the step function. The service is periodically reevaluated as shown in FIG. 3. If performance of the service improves, such as by falling within a threshold as disclosed with respect to FIG. 2, the number of threads available for use by the service may be increased. If the service is still performing above the threshold, the number of threads may be further decreased. Thus, the number of threads available for use of the service may increase or decrease according to a step function and based on performance of the service.

Referring again to FIG. 1, some computing platforms as disclosed herein may not make use of a service manager 140 as previously described. Furthermore, even in platforms that include such a service manager, some sites may directly access external resources 170 separately from the interface provided by the service manager 140. For example, many such services provide an application programming interface (API) or similar interface, which may be accessible via a uniform resource locator (URL) dedicated to the service. Some resources may provide multiple services via similar or related URLs. For example, a commerce-related resource 170 may provide a sales tracking service available at a URL such as example.com/api/sales and a payment processing service available at a URL such as example.com/api/payments. Each service may be independent and distinct from the other, such that it may be possible for one service to exhibit unacceptable performance, such as delayed responses to service calls made to the associated URL, while the other service performs acceptably. In some cases, a service may have sub-services that can be treated as independent services as disclosed herein. For example, an external user account service may provide current and historical data via related but separate service call URLs, such as example.com/api/user and example.com/api/user/history. In this case, the "history" service may be treated independently from the "user" service, even though the "history" service URL contains the root URL for the "user" service. More generally, each service accessed directly by sites on the computing platform may or may not operate within a threshold service call response time as previously disclosed.

However, services that are accessed directly by the plurality of sites 110 on the computing platform 105 may not be immediately available to the service manager 140 or other components of the platform 105 that are used to calculate a threshold as shown in FIG. 2 and to set a resource throttle as shown in FIG. 3. Accordingly it may not be possible to determine the threshold response time and/or to implement a throttle on threads available for service calls to the services provided by the external resource for calls made directly by sites in the same way as for services managed by a service manager 140 or similar component.

Figure 4:
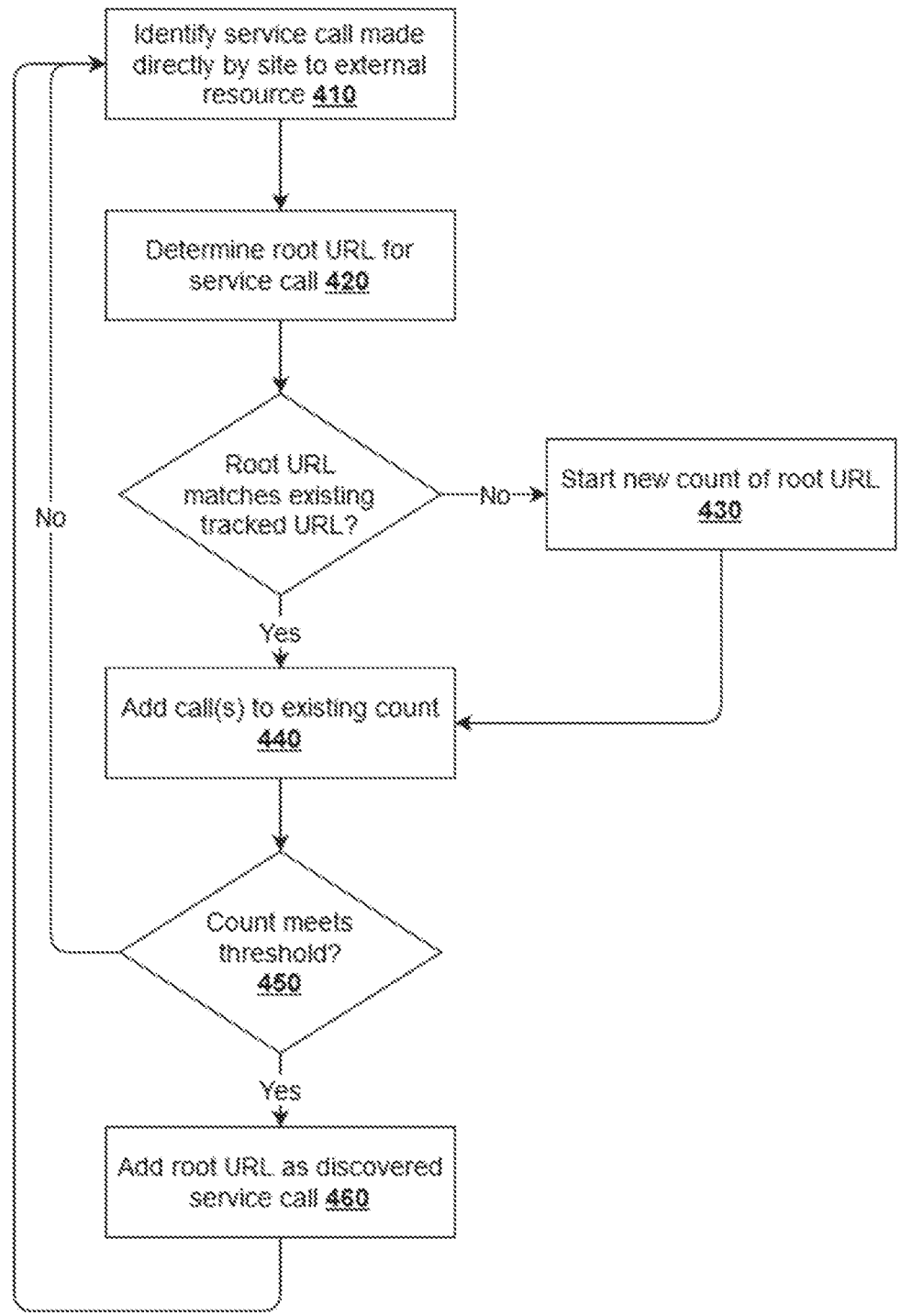
FIG. 4 shows an example process for identifying and monitoring services that are called directly by sites on a computing platform according to an embodiment of the disclosed subject matter.

To manage such direct service calls, a computing platform as disclosed herein may group service calls made directly to external resources by sites on the platform. FIG. 4 shows an example process for tracking such calls. At 410, the platform may identify a service call made directly to an external resource by a site on the platform. For example, the site may monitor outgoing network communications to identify those that are structured like API or other service calls, or that follow a known pattern of request/response, or that otherwise match a communication known or expected to be a service call to a remote resource.

At 420, the platform may determine the root URL for the service call, i.e., the portion of the URL that identifies the service being accessed by the site. For example, a site on the platform may directly access a resource using a complete URL of example.com/api/payments?type=cc&h=Ax84D02j&cf=3&cs=5502945. When accessed by the same site again or by a different site, the complete URL may be, for example, example.com/api/payments?type=d&h=edo45CV1&cf=3&cs=9473047. Typically, the portions of the URL after "?" are parameters passed to the service. Other structures may be used, such as example.com/api/payments/cc/Ax84D02j/3/5502945. In this process, the "root" portion of the URL refers to the portion of the URL that remains the same regardless of the site calling the service and the parameters being passed, i.e., the complete URL excluding all parameters and optional attributes. Continuing the example, the "root" portion of the URL is example.com/api/payments. Generally the platform may be able to identify a root URL because it will recur within multiple service calls made by one or more sites on the platform. As previously noted, a root URL may include one or more other root URLs, that may be associated with a separate service, each of which may be identified and monitored separately and independently of the other(s). If the identified root URL matches an existing root URL being tracked by the platform, at 440 the platform may increment an ongoing count of the number of service calls made to the external service associated with the root URL by the number of calls identified at 410.

If the root URL does not match an existing URL being tracked, the platform may begin tracking the new root URL by starting a new count of service calls made to the root URL at 440.

As previously disclosed, the ongoing count of service calls made to an external resource at a root URL may be absolute, or it may be reset periodically unless or until the count reaches a predetermined threshold, or it may be a rolling count where each increment to the count expires a set period of time after the count is incremented. This allows the platform to track those external services that should be considered along with services defined in and managed through the service manager as previously disclosed, by selecting those external services that meet a usage threshold at 450. For example, it may be desirable to include services called directly by sites in the throttling techniques disclosed herein when the service receives a total number of calls above a threshold, such as 50 total service calls. As another example, it may be desirable to include services only if they have a regular rate of service calls above a threshold, such as at least 50 service calls per minute, hour, day, or the like, or when the service receives a minimum number of calls within a set period of time, such as a total of 50 calls within five minutes regardless of the number or rate of calls before or after the five minute period. If the current count of service calls meets the threshold at 450, the root URL may be added to a list of known external services that are not managed by a service manager at 460.

Once a root URL has been identified as a service at 460, it may be monitored and throttled in the same way as managed services, as previously described with respect to FIGS. 2 and 3. For example, the number of threads used to make calls to the root URL may be tracked, and where the root URL service experiences a performance issue, the number of threads available for calls to the root URL service may be throttled as shown in FIG. 3.

In some cases the platform may provide a dashboard or other interface to allow users to manage throttling options for services as disclosed herein. For example, administrator or maintenance users of the platform may want to view and/or modify the status of a service being monitored by the platform. FIG. 5 shows an example of such a dashboard. The interface provides a list of all services being monitored by the platform, the status of each, the last time the service status was checked (such as via the process disclosed in FIGS. 2-3), and the threshold applied if the service is subject to a throttle. The services in this example include five services managed through a service manager as previously disclosed and two services that the platform discovered through a process as shown in FIG. 4, which are being called directly by sites on the platform. The dashboard indicates that the managed "Tracking" service and the directly-called "example.com/api/count" service are being throttled, i.e., each has a restriction on the number of threads available to call the service, the "Payments 2" service is offline entirely, i.e., not available for use, and the other monitored services are operating normally and without any thread limiting in place. The throttle level may be a direct indication of the number or percentage of threads allowed for calling the service, or it may be a relative level that is translated by the platform to an actual number of threads. For example, where the throttling process allocates a percentage of total threads available when a thread limit is imposed, it may be more useful for users to view and modify the percentage rather than an actual number of threads, which may change while the interface is being accessed. The interface also may provide additional functions for the user to manage each service. For example, the functions may include refreshing the service status, imposing a thread limit by activating a throttle for the service; disabling the service entirely; and adjusting the threshold if the service is currently being throttled. The functions shown in FIG. 5 are provided by way of illustration only, and any other function capable of being performed with respect to a service on the platform may be included without departing from the scope or content of the present disclosure.

A dashboard or similar interface as shown in FIG. 5 may update in real-time or near real-time as accessed by the user. For example, if the platform determines that a service should be throttled and imposes a thread limit as described with respect to FIG. 3, the interface may immediately update to show the status of the newly-throttled service as well as the thread limit imposed. Similarly, if a throttle is automatically removed, the status of the associated service may immediately update to show the services status as "Normal" (in this example). Other features may be included in the dashboard interface. For example, services may be grouped by source or provider, status, type, or any other attribute of the services. Such grouping and other visual techniques may allow a user to obtain an immediate "snapshot" of services available to sites on the platform.

As previously disclosed, it may be desirable for users to be able to modify thread limits applied to services available to sites on the platform independently of the automated processes previously disclosed herein. For example, a user may want to impose a thread limit on a site to verify whether or not the service is a cause of an issue observed on the platform, regardless of whether the service meets the threshold requirements previously disclosed.

Embodiments disclosed herein may provide a variety of benefits to users of the computing platform as well as their respective end users, as well as the computing platform itself. Users may benefit by having access to sites and services that otherwise may be disabled by a computing platform due to a performance issue. In many cases limited or slower access to a service may be preferable to end users compared to the service being disabled completely, such as where the service is an authentication service without which the end users cannot access a desired site at all, or a payment processing service without which many functions of an e-commerce site may be rendered inoperable.

Similarly, the computing platform itself may have improved availability, efficiency, or other performance enhancements by using the adaptive throttling techniques disclosed herein. For example, one alternative to the adaptive throttling techniques would be to disable a poorly-performing service until an underlying performance issue is addressed by the service. However, in this case the platform may be less useful to users and their respective end users due to the service being unavailable. Alternatively, allowing a poorly-performing service to continue operating may impact other services accessed by sites on the platform, or other functionality of the platform itself as the poorly-performing service requires increasing amounts of platform resources to access, meaning there are fewer resources available for use elsewhere in the platform. Accordingly, the use of the throttling techniques disclosed herein may greatly improve the behavior and performance of a computing platform as disclosed herein.

Embodiments disclosed herein may be implemented in and used with a variety of component and network architectures. FIG. 6 is an example computing device 20 suitable for implementing aspects of the presently disclosed subject matter as previously disclosed, including but not limited to a personal computing device that may be used by a user or a customer to access sites on a computing platform as disclosed herein, a server or cloud computing component suitable for hosting and/or implementing the computing platform, or the like. The device 20 may be, for example, a desktop or laptop computer, a mobile computing device such as a phone or tablet, or the like, a headless or other server architecture, or the like.

The device 20 may include a bus 21 which interconnects major components of the computer 20, such as a central processor 24, a memory 27 such as Random Access Memory (RAM) or the like, a user display or other output device 22 such as a display screen, one or more user input devices 26, which may include one or more controllers and associated user input devices such as a keyboard, mouse, touch screen, and the like, a fixed storage 23 such as a hard drive, flash storage, and the like, a removable storage unit 25 operative to control and receive an optical disk, flash drive, and the like, and a network interface 29 operable to communicate with one or more remote devices via a suitable network connection.

The bus 21 allows data communication between the central processor 24 and one or more memory components. Applications resident with the computer 20 are generally stored on and accessed via a computer readable medium, such as a fixed storage 23 and/or a removable storage 25 such as an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, Wi-Fi, Bluetooth®, near-field, and the like. For example, the network interface 29 may allow the computer to communicate with other computers via one or more local, wide-area, or other communication networks. Other components may be included and some described components may be omitted without departing from the scope or content of the disclosed embodiments.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
calculating a plurality of performance levels for a first service of a plurality of services accessed by a plurality of sites on a computing platform that manages access to the plurality of services by the plurality of sites, each performance level indicating a response time below which the majority of calls to the service are completed;
determining a maximum service call completion threshold based upon the plurality of performance levels;
determining that a predefined percentage of calls to a first service within a predefined period of time exceed the maximum service call completion threshold and, in response, applying a throttle to a maximum number of threads available for calling the service by sites on the platform.

2. The method of claim 1, wherein the performance level is a response time below which 95% of calls to the first service within a predefined period of time are completed.

3. The method of claim 1, wherein the first service is a resource that is external to the computing platform.

4. The method of claim 3, wherein the first service is identified by the computing platform based on a plurality of direct calls made to the external resource by the plurality of sites on the platform.

5. The method of claim 4, further comprising identifying a sub-service within the first service that is provided by a separate portion of the external resource based upon common portions of a uniform resource locator (URL) used to access the first service and the sub-service by the plurality of sites.

6. A computing platform that provides computing resources to a plurality of sites that are accessed by a plurality of users and that manages access by the sites to a first service, the computing platform comprising:
a processor; and
a computer-readable memory storing instructions for execution by the processor which, when executed by the processor, cause the processor to:
calculate a plurality of performance levels for a first service of a plurality of services accessed by a plurality of sites on a computing platform that manages access to the plurality of services by the plurality of sites, each performance level indicating a response time below which the majority of calls to the service are completed;
determine a maximum service call completion threshold based upon the plurality of performance levels;
determine that a predefined percentage of calls to a first service within a predefined period of time exceed the maximum service call completion threshold and, in response, applying a throttle to a maximum number of threads available for calling the service by sites on the platform.

7. The computing platform of claim 6, wherein the performance level is a response time below which 95% of calls to the first service within a predefined period of time are completed.

8. The computing platform of claim 6, wherein the first service is a resource that is external to the computing platform.

9. The computing platform of claim 8, wherein the first service is identified by the computing platform based on a plurality of direct calls made to the external resource by the plurality of sites on the platform.

10. The computing platform of claim 9, the instructions further causing the processor to identify a sub-service within the first service that is provided by a separate portion of the external resource based upon common portions of a uniform resource locator (URL) used to access the first service and the sub-service by the plurality of sites.

11. A non-transitory computer-readable medium storing a plurality of instructions which, when executed by a computer processor, cause the computer to:
calculate a plurality of performance levels for a first service of a plurality of services accessed by a plurality of sites on a computing platform that manages access to the plurality of services by the plurality of sites, each performance level indicating a response time below which the majority of calls to the service are completed;
determine a maximum service call completion threshold based upon the plurality of performance levels;
determine that a predefined percentage of calls to a first service within a predefined period of time exceed the maximum service call completion threshold and, in response, applying a throttle to a maximum number of threads available for calling the service by sites on the platform.

12. The medium of claim 11, wherein the performance level is a response time below which 95% of calls to the first service within a predefined period of time are completed.

13. The medium of claim 11, wherein the first service is a resource that is external to the computing platform and the first service is identified by the computing platform based on a plurality of direct calls made to the external resource by the plurality of sites on the platform.

14. The medium of claim 13, wherein the instructions further cause the computer to identify a sub-service within the first service that is provided by a separate portion of the external resource based upon common portions of a uniform resource locator (URL) used to access the first service and the sub-service by the plurality of sites.

* * * * *